Patented Aug. 4, 1942

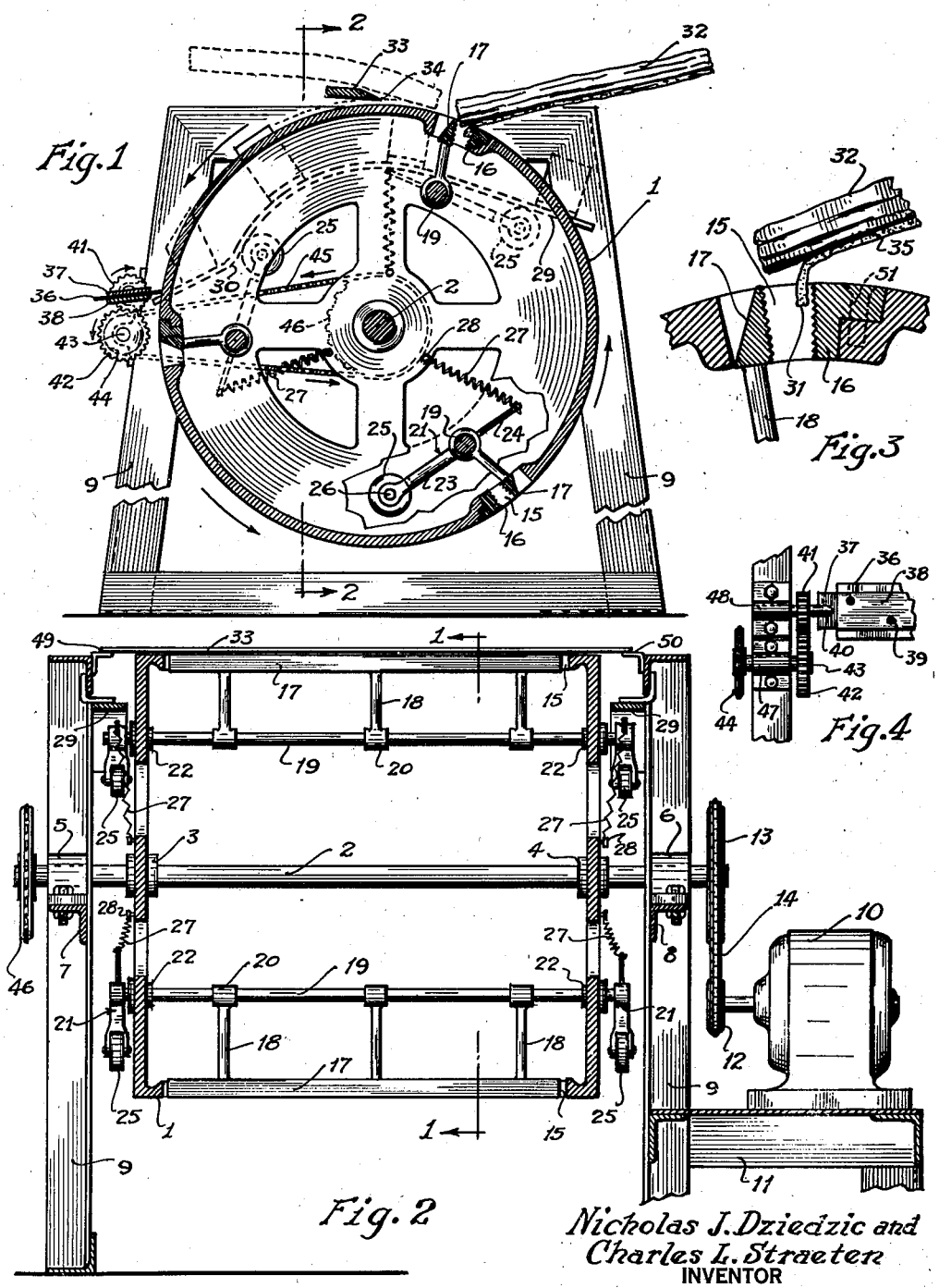

2,292,319

UNITED STATES PATENT OFFICE 2,292,319

SKINNING MACHINE

Nicholas J. Dziedzic and Charles L. Straeten, Chicago, Ill., assignors to Industrial Patents Corporation, Chicago, Ill., a corporation of Delaware Application October 27, 1939, Serial No. 301,650

7 Claims. (Cl. 146—130)

This invention relates to the removal of skins from pork bellies.

One of the objects of the invention is to provide an improved belly skinning machine.

The invention also has among its other objects the provision of a means for removing the skin from smoked bacon prepared from bellies which have not been skinned prior to smoking.

Bacon of the conventional type is prepared from pork bellies which before curing are known as green bellies. Where it is desired to produce a slab of bacon without skin it is customary to remove the skin from the pork belly before curing or in any event, before smoking. However, in many instances bacon slabs which have been prepared without removal of the skin are utilized for the production of sliced bacon which necessitates removal of the skin before slicing. There are some advantages in curing and smoking pork bellies without removing the skin as when the market for pork skin is low and it is desired to reduce as much as possible the shrink from the green bellies to the smoked bacon.

Several devices have been developed for removal of skin from green bellies. The device most widely in use is exemplified by the patent to Morrison, No. 1,516,678, with the improvements described and claimed in the patent to Morrison, No. 1,790,592. Machines such as the Morrison machine and the machine disclosed in the patent to Miller, No. 2,155,730, employ grab pins preferably placed in depressions in the periphery of a drum. These pins are permitted to pass into the edge of the skin of a belly whereby the belly is pulled past a knife set to sever the belly from the skin as by a shaving process.

It has been found in practice that machines of this type can not be used satisfactorily for skinning smoked bacon. The character of the skin is radically changed during smoking. It is shrunk and rendered relatively hard and tough. The amount of shrink is not identical in every slab with the result that grab pins frequently can not be made to penetrate and hold the skin and with the further result that when this is more or less successfully done, there is a tendency for a relatively large quantity of fat to be peeled away with the skin.

The invention will be understood by reference to the drawing in which

Figure 1 is a cross sectional view of a preferred embodiment of the device.

Figure 2 is a sectional view on the line 2—2 of Figure 1.

Figure 3 is a detail of the jaw members employed in the device shown in Figures 1 and 2.

Figure 4 is a detail of the beater driving means.

In the embodiment of the invention illustrated in the drawing, drum 1 is secured to shaft 2, as at 3 and 4. Shaft 2 is journalled in bearings 5 and 6, which are mounted on cross members 7 and 8, respectively, supported by the standards of framework 9. As viewed in Figure 1, shaft 2 is rotatably driven in counter-clockwise direction by power transmitted from motor 10 mounted on standard 11 through the medium of sprockets 12 and 13 and chain 14 which may be clearly seen by reference to Figure 2.

The peripheral surface of drum 1 is provided with a series of spaced longitudinal open slots 15 provided at one edge with a fixed jaw 16 which is preferably corrugated or other protuberances of a height insufficient to perforate a belly skin and designed to cooperate with movable jaw 17. Movable jaw 17 is rigidly affixed to a plurality of links 18 which in turn are rigidly affixed to shaft 19 as at 20. Shaft 19 is journalled in bearings 22 mounted in the end walls of drum 1. Shaft 19 is provided with levers 21 rigidly affixed to the ends of shaft 19 exteriorly of drum 1, having arms 23 and 24. Arm 23 carries roller 25 rotatably mounted on arm 23 by pin 26, and is normally urged outwardly from the center of the drum by the action of spring 27 affixed to the free end of arm 24 and to the drum 1 as as 28.

When shaft 2 is rotated, it carries with it the entire assembly, as will be seen by reference to Figure 1. Roller 25 is carried into contact with cam surface 29, leaving the cam surface as at 30. Cam surface 29 is designed so that when the normally open jaws 16 and 17 reach a point close to the top of the circle of travel, the edge of the skin of the bacon slab or green belly which has previously been separated by an operator may be inserted between jaw 16 and jaw 17. As the drum rotates, the action of cam surface 29 in combination with roller 25 causes jaw 17 to approach jaw 16 and grasp the severed skin edge 31 between the jaws 16 and 17, thereby causing the entire slab 32 to be drawn toward knife 33. Knife 33 is adjusted so that the edge 34 penetrates the bacon slab or belly in a manner to just sever or shave off the skin 35. The skinned slab passes over knife 33, and the skin 35 passes beneath knife 33.

To positively remove skin 35 from the periphery of drum 1, a beater is provided comprising a piece of belting 36 which may be mounted on plate 37, being secured to plate 37 by means of a second plate 38 and screws 39. Plate 37 is affixed to a shaft 40 at either end of the plate, the shafts 40 being journalled in bearings 48 on opposite sides of frame 9. Plate 37 is rotated by power transmitted to gear 41 from gear 42 on shaft 43, sprocket 44, chain 45 and sprocket 46 on shaft 2. Shaft 43 is rotatably mounted in bearing 47 on frame 9.

The speed of rotation of the beater may be regulated by adjustment of the relative sizes of gears 41 and 42 and sprockets 44 and 46. The width of the strip of belting 36 is sufficient so that as it revolves in a clockwise direction, the edges slap against the periphery of the drum, thus freeing the skin 35 from the periphery of the drum. The beater assembly is positioned so that when the free end of skin 35 approaches the beater, rollers 25 ride off of cam surfaces 29 at 30 whereby spring 27 causes jaw 17 to separate from jaw 16, releasing the skin 35 and placing the jaw in position for the insertion of the edge of the skin of another belly on the next cycle. When the jaws separate to release the gripped edge of the skin, the free end of the skin is driven away from the surface of drum 1 and the skin falls by gravity.

It will be noted that knife 33 is mounted on the frame of the machine as at 49 and 50 and may be removed for sharpening and may, of course, be adjusted with reference to the distance of the edge of the blade to the periphery of the drum. Because of the wear to which jaws 16 and 17 are subjected, it is desirable that these elements be made of steel. As will be seen by reference to Figure 3, jaw 16 may be affixed to drum 1 as by machine screws 51.

It will be seen that the present invention involves a device for removing the skins from pork bellies or bacon slabs in which one edge of the skin is loosened from the belly and securely gripped while the skin is severed from the slab.

We claim:

1. A belly skinning machine comprising a drum having a longitudinal slot therein, a fixed jaw on one side of the slot and a movable jaw mounted on a shaft provided with means for cooperating with a cam surface to open and close the jaws, the means comprising a lever rigidly affixed to the shaft, provided at one end with a spring for holding the movable jaw in a normally open position, and provided at the other end with a roller adapted to ride over the cam surface and hold the movable jaw in the closed position.

2. A belly skinning machine comprising a frame, a shaft mounted in the frame, a drum rigidly affixed to the shaft, means for driving the shaft, a plurality of longitudinal slots in the periphery of the drum, one edge of the slot provided with a fixed jaw member, a movable jaw member adapted to move in each of the slots and cooperate with its respective fixed jaw member, the movable jaw members being carried by links fixedly mounted upon shafts journalled in the ends of the drum and provided with fixed levers positioned exteriorly of the drum, the levers having two extending arms, one arm of which is provided with a spring for normally urging through the shaft and the links the jaw member in an open position, the other arm of the lever being provided with a roller adapted to cooperate with a cam surface for resisting the force of said spring and closing the jaws.

3. A belly skinning machine comprising a rotatable drum having a longitudinal slot therein, a rigid knife in spaced relationship to the periphery of said drum, a fixed jaw on one side of said slot, a movable jaw substantially as long as the slot adapted to cooperate within the slot with the fixed jaw for gripping the severed edge of the skin of the belly, and means for bringing the movable jaw into close contact with the fixed jaw during a portion of the rotation of said drum, and to disengage said jaws during the balance of the rotation of said drum, the contacting surfaces of said jaws being provided with protuberances of a height insufficient to perforate a skin.

4. A belly skinning machine comprising a rotatable drum having a longitudinal slot therein, a rigid knife in spaced relationship to the periphery of said drum, a fixed jaw on one side of the slot, and a movable jaw substantially as long as the slot mounted on a shaft provided with means for cooperating with a cam surface to close the said jaws during one stage of the rotation of said drum and to open said jaws during the balance of the rotation of said drum, said means comprising a lever provided with a roller adapted to pass over the cam surface, the contacting surfaces of said jaws being provided with protuberances of a height insufficient to perforate a skin.

5. A belly skinning machine comprising a rotatable drum having an elongated recess therein, a fixed jaw on one side of the recess, a movable jaw operating transversely of said recess for gripping a severed edge of the skin of the belly against said fixed jaw, tension means normally urging said movable jaw to an open position and means for closing the movable jaw during a portion of the rotation of the drum to grip said edge of skin during the skinning operation.

6. A belly skinning machine comprising a rotatable drum, an elongated recess in said drum having a roughened edge adapted for a fixed jaw, a movable jaw operable transversely of said recess and having the extremity of said jaw, when open substantially flush with the periphery of the drum, tension means normally urging said movable jaw to an open position and reciprocating means for closing the movable jaw during a portion of the rotation to grip the skin during the skinning operation.

7. A belly skinning machine comprising a rotatable drum having a recess therein, a fixed and a movable jaw in said recess to grip a severed edge of skin, means normally urging the movable jaw in an open position, a knife cooperating with said drum to sever the skin, means synchronized with the rotation of the drum to close the jaws so as to grasp the skin while passing by the knife to effect skinning and a beater to remove the skin from the drum after the skinning operation.

NICHOLAS J. DZIEDZIC.
CHARLES L. STRAETEN.